United States Patent
Czarnecki et al.

(10) Patent No.: US 6,424,905 B1
(45) Date of Patent: Jul. 23, 2002

(54) VACUUM ACTUATED VEHICLE SPEED CONTROL SYSTEM

(75) Inventors: Edward W. Czarnecki, Shelby Township; Margaret C. Novacek, South Lyon; Daniel H. Black, Shelby Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/401,116

(22) Filed: Sep. 22, 1999

(51) Int. Cl.[7] .......................... B60T 8/24; G06F 17/00; B60K 31/10; B60K 31/08
(52) U.S. Cl. ..................... 701/95; 701/53; 701/54; 701/97; 701/107; 701/110; 180/176; 180/177; 477/107; 477/120; 123/389
(58) Field of Search ..................... 701/95, 97, 107, 701/110, 53, 54, 104; 477/56, 64, 107, 120; 180/176, 177; 123/389

(56) References Cited

U.S. PATENT DOCUMENTS

| | | | | |
|---|---|---|---|---|
| 4,723,213 A | * | 2/1988 | Kawata et al. ................ | 701/93 |
| 4,814,991 A | * | 3/1989 | Tada et al. .................... | 701/93 |
| 4,931,939 A | * | 6/1990 | Kawata et al. ................ | 701/93 |
| 5,003,482 A | * | 3/1991 | Teratani et al. ............... | 701/95 |
| 5,154,250 A | * | 10/1992 | Murai ......................... | 180/179 |
| 5,270,934 A | * | 12/1993 | Kobayashi ................... | 701/95 |
| 5,484,350 A | * | 1/1996 | Ishikawa et al. ............. | 477/97 |
| 5,778,331 A | * | 7/1998 | Leising et al. ................ | 701/66 |

* cited by examiner

Primary Examiner—Jacques H. Louis-Jacques
Assistant Examiner—Brian J. Broadhead
(74) Attorney, Agent, or Firm—Thomas A. Jurecko

(57) ABSTRACT

A method and system adjusts powertrain controls to avoid significant deviations from set speed during speed control operation. Low vacuum conditions of a reservoir vacuum resulting from high load conditions are detected and eliminated through the initiation of downshifts. Detection is based on the determination that speed control mode has been initialized, the throttle is extended, vehicle acceleration is low, and there has been a significant deviation from set speed. The downshift creates an increase in engine rpm and a reduction in throttle angle to increase the manifold vacuum and thereby recharge the reservoir vacuum and eliminate the low vacuum condition. The transmission can be returned to normal operation and the pre-adjustment gear upon elimination of the low vacuum condition or the occurrence of a driver override condition.

15 Claims, 4 Drawing Sheets

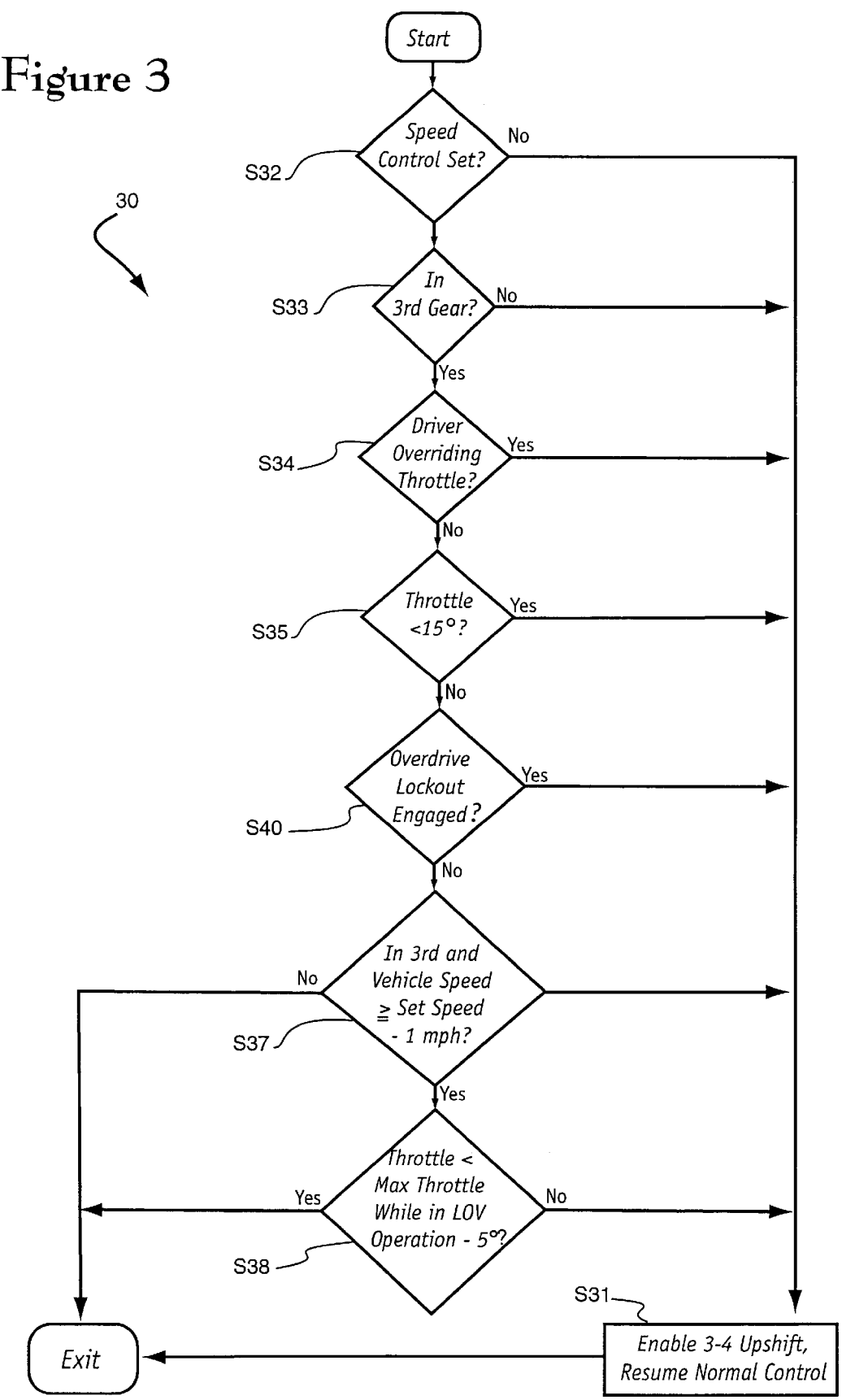

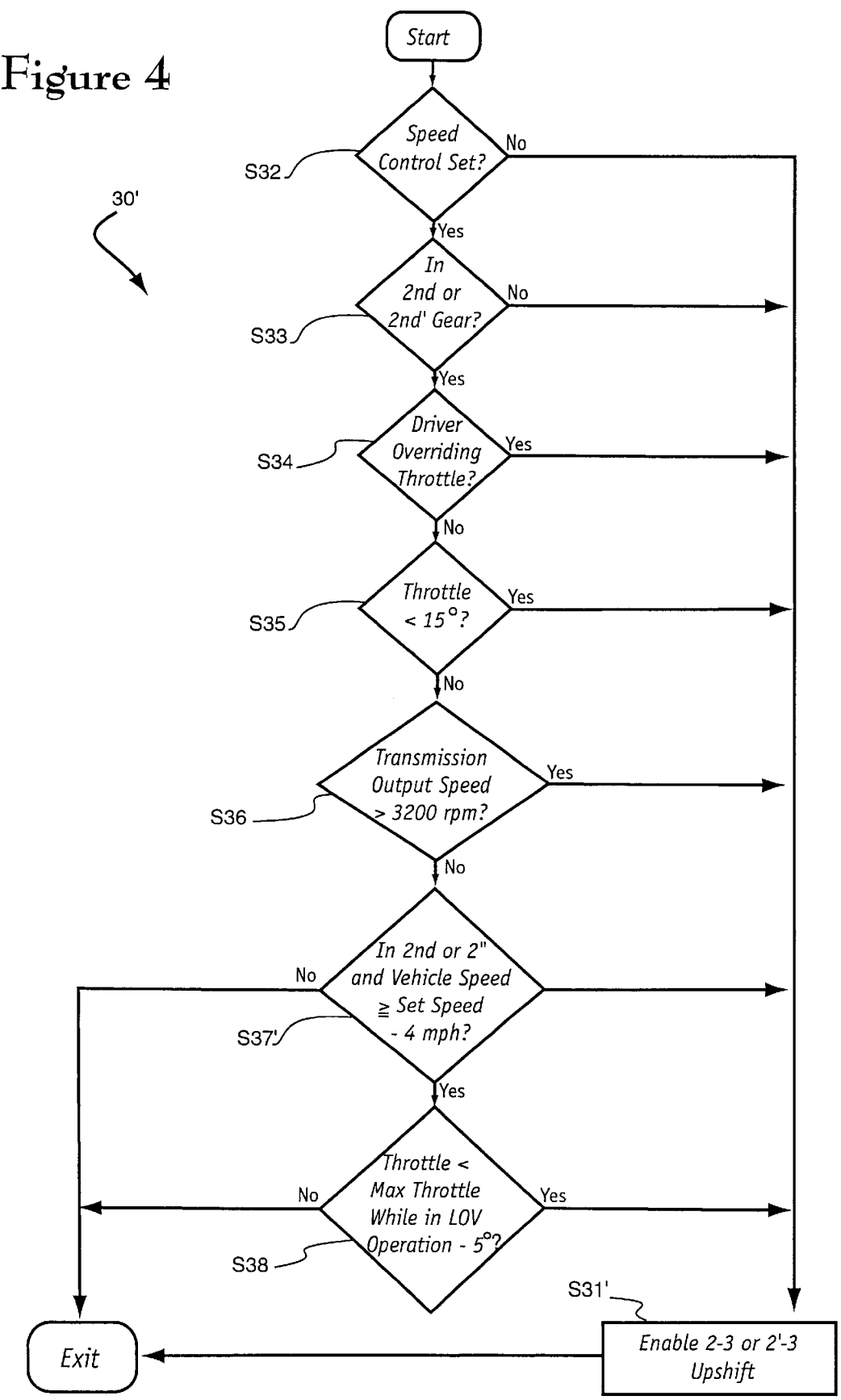

ND SUMMARY OF THE
VACUUM ACTUATED VEHICLE SPEED CONTROL SYSTEM

BACKGROUND OF THE INVENTION

Field of the Invention

The present invention relates generally to vehicle speed control systems, and more particularly to vacuum actuated vehicle speed control systems.

BACKGROUND AND SUMMARY OF THE INVENTION

In the automotive industry, the objective of an automatic vehicle speed control system is to sustain a steady speed under varying road conditions, thus providing the vehicle operator with relief from constant throttle manipulation by the foot. In some cases, the cruise control system may actually improve fuel efficiency by limiting throttle excursions to small steps. Some speed control programs check the vehicle speed in order to determine when to return to set point speed as well as determine when to protect for unsafe acceleration under certain conditions. These systems are ineffective, however, in promptly responding to load increases due largely to the requirement for significant deviation from set speed before correction takes place.

Many vehicles utilize a vacuum actuated speed control servo system for automatic speed control. When a vehicle powertrain including an engine and a transmission is operated under heavy loads and speed control is engaged, the engine's reservoir vacuum will frequently become depleted and render the system unable to control the vehicle speed as desired. This depletion results in insufficient vacuum in the reservoir to pull the throttle body further open as needed to maintain vehicle speed. Loss of vacuum under high load conditions therefore results in loss of vehicle speed and insufficient force to cause the throttle to achieve a position to initiate a downshift. Current systems fail to adequately address this phenomenon when controlling vehicle speed. The resulting effect experienced by the driver is a significant loss of vehicle speed on inclines or under towing conditions when operating the vehicle in speed control mode. Another problem is associated with the fact that there is difficulty in addressing customer complaints regarding such problems with speed control operation. Simply put, service personnel are often unaware of recent depletions in reservoir vacuum when the vehicle is brought in for maintenance, and may therefore have difficulty diagnosing the problem. It is thus desirable to develop a method and system wherein losses of reservoir volume can be controlled during occurrence and identified during servicing.

The present invention detects a low speed control reservoir vacuum condition and recharges the reservoir vacuum to eliminate the low vacuum condition. This adjustment allows the vehicle to avoid significant deviations from set speed during speed control operation. The low vacuum condition is detected by monitoring various vehicle control signals currently well known in the art. For example, a low/medium throttle angle, combined with a low vehicle acceleration and a high deviation from set speed under certain circumstances can imply that a low vacuum condition has occurred. Thus, by monitoring the vehicle signals for throttle angle, vehicle acceleration, and vehicle speed, the present invention can initiate the necessary downshift to recharge the reservoir vacuum. The present invention also allows for an informational fault to be set in addressing customer complaints regarding speed control operation.

Furthermore, the present invention allows the transmission to return to normal operation either when the low vacuum condition has been eliminated or when a driver override condition is present.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a flow chart of a process for returning a vehicle automatic transmission to normal fourth gear operation according to the principles of the present invention; and FIG. 4 is a flow chart of a process for returning a vehicle automatic transmission to normal third gear operation according to the principles of the present invention.

DETAILED DESCRIPTION OF THE PREFERRED EMBODIMENTS

The following discussion related to adjusting vehicle powertrain controls is merely exemplary in nature, and is in no way intended to limit the invention or its applications or uses. The present invention provides a method and system for detecting a low vacuum condition of a speed control reservoir vacuum. Such a condition generally results from a speed control mode operation under high load conditions. The present invention allows for timely response to these high load conditions by recharging the reservoir vacuum to eliminate the low vacuum condition. The invention further includes the steps of detecting a need for termination of adjustment and terminating the adjustment process in response to the detected need. The method can be readily implemented in either an engine controller, a transmission controller or both through signal processing means currently well known in the art. The adjustment ultimately allows the vehicle to avoid significant deviations from a set speed during speed control operation.

The present invention appreciates that a number of factors indicate a low vacuum condition and provides for the detection and efficient processing of these factors.

Figure 1:
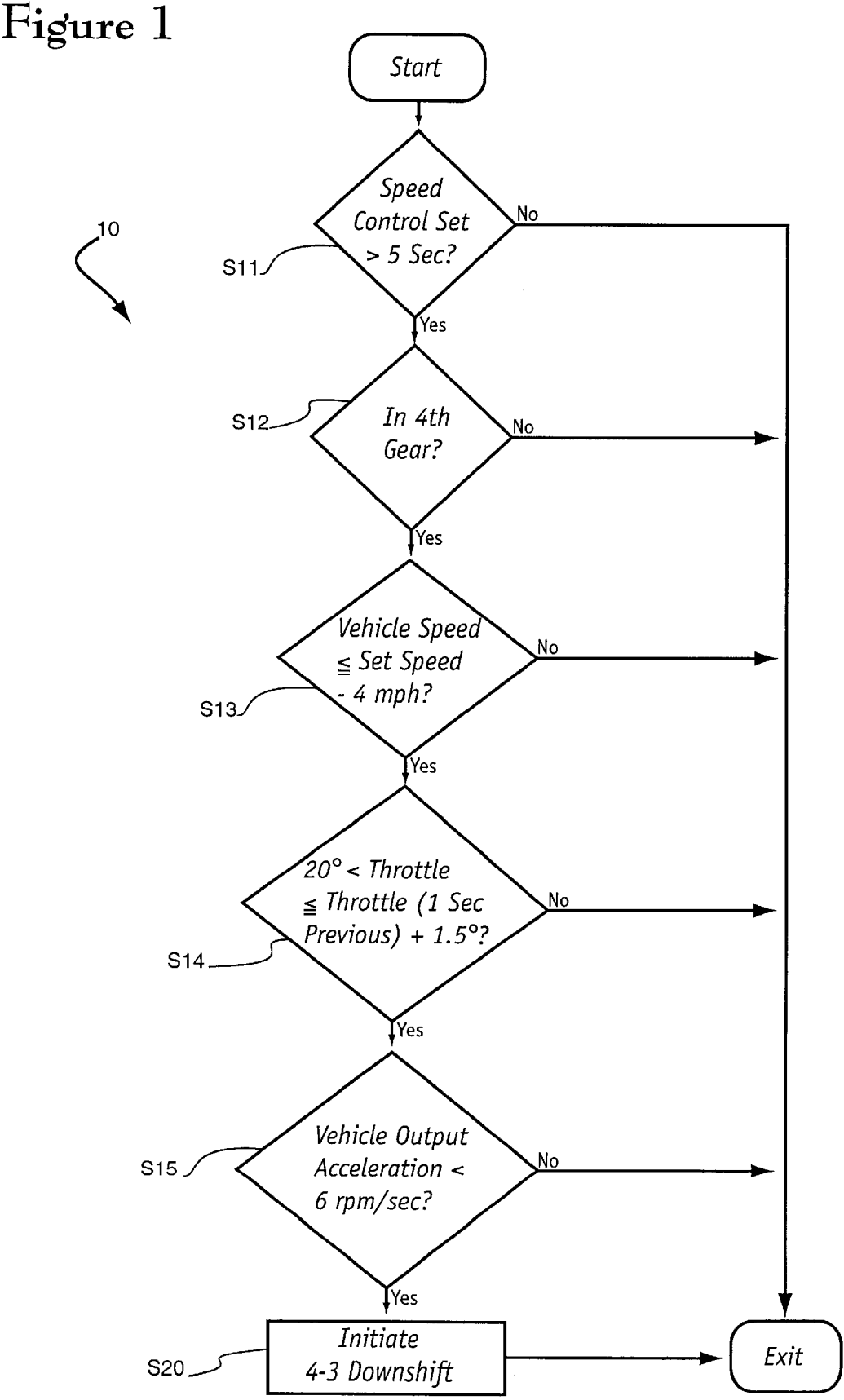
FIG. 1 is a flow chart of a process for detecting a low vacuum condition in a transmission which is in fourth gear and initiating a downshift according to the principles of the present invention.
Figure 2:
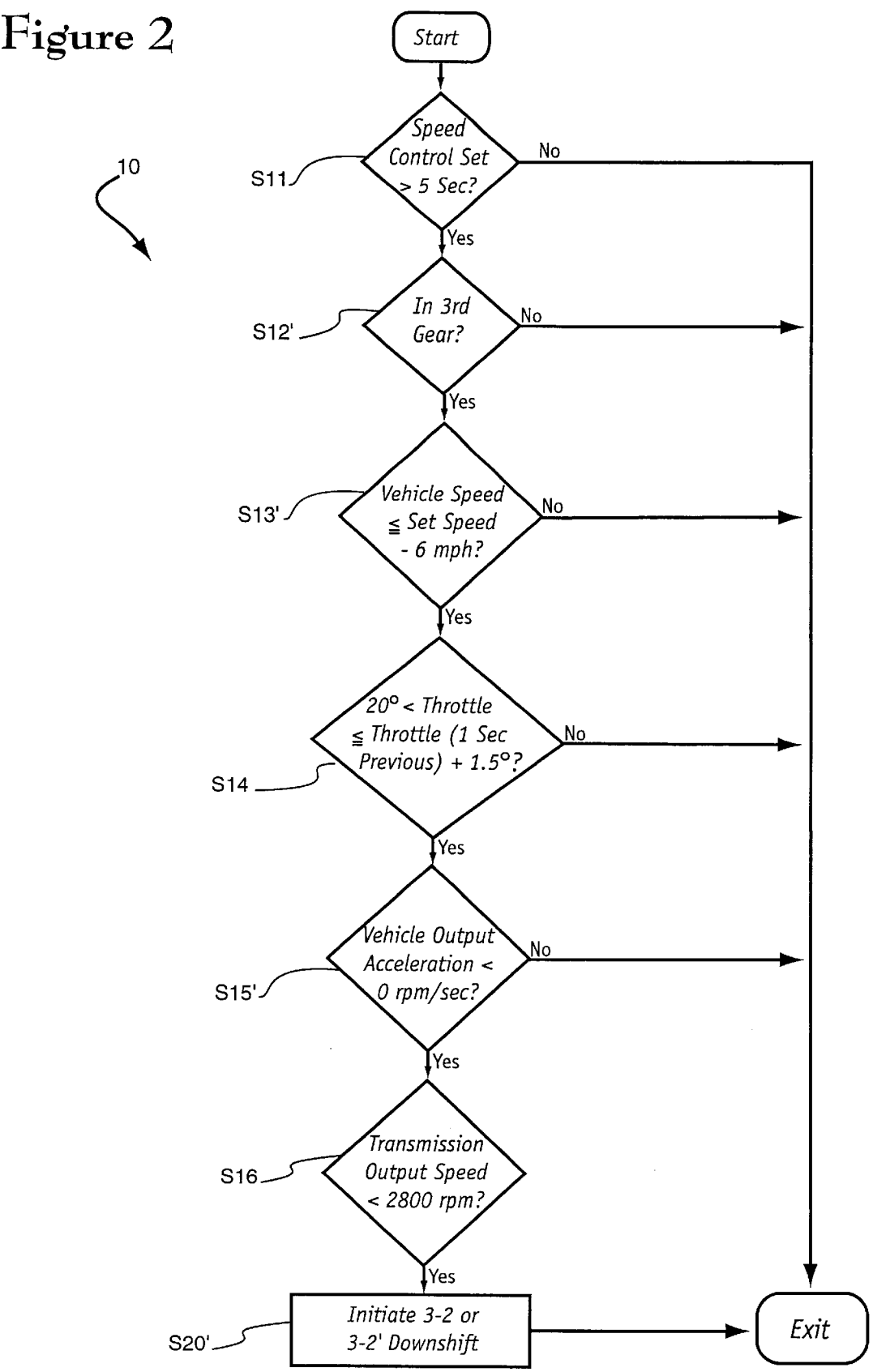
FIG. 2 is a flow chart of the process for detecting a low vacuum condition in a transmission which is in third gear and initiating a downshift according to the principles of the present invention.

Referring now to FIGS. 1 and 2, a logic flow for detecting a low vacuum condition of a reservoir vacuum and initiating a downshift is shown generally at 10 and 10'. Primes are used to indicate similar steps with different values or measurement requirements and will only be referred to when clarification is helpful. While steps S12 and S12' generally indicate that the present invention preferably envisions embodiments for transitioning from either fourth or third gear, respectively, it should be appreciated that the present invention can be readily applied to other gear transitions. It is also important to note that the particular order in which the following steps are performed is not critical to successful operation.

The low vacuum condition detecting subroutine 10 generally includes the step of detecting an initialization of speed control mode operation for the transmission, wherein the initialization indicates that the transmission has had sufficient time to adjust to the high load conditions. The step S11 of determining that a speed control set time is greater than five seconds is the preferred approach for detecting this initialization. The low vacuum condition detecting subroutine 10 also includes the step of detecting a significant deviation from set speed. This deviation indicates a loss of vehicle speed control. Specifically, the present invention determines whether the vehicle speed is less than a predetermined speed at steps S13 and S13'. As shown in FIG. 1, when the transmission is in fourth gear the predetermined speed is the set speed minus a predetermined value such as 4 mph, whereas FIG. 2 indicates that when the transmission is in third gear the predetermined speed is the set speed minus a predetermined value such as 6 mph. The low vacuum condition detecting subroutine 10 also detects low acceleration which indicates an inability to retain vehicle speed control. The low acceleration detecting step includes the steps of determining that the throttle angle is less than a previous throttle plus a predetermined value such as 1.5° at step S14, and determining that the vehicle output acceleration is less than a predetermined acceleration at S15. The previous throttle represents a throttle angle measurement taken one second earlier. As shown in FIG. 1, when the transmission is in fourth gear the predetermined acceleration is 6 rpm/s, whereas FIG. 2 indicates that when the transmission is in third gear the predetermined acceleration is 0 rpm/s at S15'. Finally, the low vacuum condition detecting subroutine 10 then looks for an extended throttle (beyond a predetermined limit) which indicates that the inability to retain speed control is due to the low vacuum condition. Preferably, the step S14 detects that the throttle angle is greater than twenty degrees in making this determination.

As shown in FIG. 2, when the transmission is in third gear, the low vacuum condition detecting subroutine 10' further includes the step S16 of determining that the transmission speed is less than a predetermined value such as 2800 rpm so that the transmission is not downshifted when the transmission speed does not warrant a downshift due to excessive speed.

As an additional feature, the present invention provides for setting an informational fault for addressing customer complaints regarding speed control operation. This fault will indicate that a loss of reservoir vacuum has occurred, and that no action or repair is necessary.

Upon detection and flagging of the low vacuum condition, at steps S20 and S20' the present invention initiates 4–3, and 3–2 downshifts, respectively, to create an increase in transmission output speed (engine rpm) and a reduction in throttle angle. This downshift allows the engine to operate at a higher speed. The result is an increased engine manifold vacuum due to the higher engine rpm and the resulting lower throttle angle as the vehicle regains set speed. This sequence recharges the reservoir vacuum to eliminate the low vacuum condition.

Turning now to FIGS. 3 and 4, the present invention also provides subroutines 30 and 30' for detecting a need for adjustment termination, and terminating adjustment of the transmission and/or engine control at steps S31 and S31'. The present invention determines that adjustment is no longer necessary upon detecting either that a driver override condition is present or that the low vacuum condition has been eliminated. For example, the driver override detecting step can include the steps S32 and S32' of determining that the transmission is not in speed control mode operation determining whether the transmission is in $3^{rd}$ gear S33 (FIG. 3) or $2^{nd}$ or $2^{nd_1}$ gear S33' (FIG. 4), as well as the steps S34 and S34' of determining that a manual throttle override has taken place. As shown in FIG. 3, when the transmission is in third gear, step S40 determines the additional driver override condition of overdrive lockout engagement.

The need for adjustment termination can also be spurred by the detection of elimination of the low vacuum condition. For example, the elimination detecting step can include the step S34 of determining that a throttle angle is less than 15° in order to detect "coast" or "cancel" operation. As best seen in FIG. 4, the elimination detecting step also preferably includes the step S36 of determining that the transmission output speed is greater than a predetermined value such as 3200 rpm when the transmission is in second gear in order to prevent overspeed of the $2^{nd}$ gear geartrain. As indicated at steps S37, S37' and S38, the elimination detecting step includes the steps of determining that the vehicle speed is greater than a predetermined speed, and that the throttle angle is less than a maximum angle minus a predetermined angle such as 5°, wherein the maximum angle is measured and retained over the period during the recharging step (S38). When the transmission is in third gear the predetermined speed is the set speed minus a predetermined value such as 1 mph (S37), and when the transmission is in second gear the predetermined speed is the set speed minus a predetermined value such as 4 mph (S37').

It is to be understood that the invention is not limited to the exact construction illustrated and described above, but that various changes and modifications may be made without departing from the spirit and scope of the invention as defined in the following claims.

What is claimed is:

1. A method for controlling a vehicle powertrain including all engine and a transmission, said method comprising the steps of:
    detecting a low vacuum condition of a reservoir vacuum of a speed controller comprising the steps of:
        detecting an initialization of speed control mode operation for the powertrain;
        detecting a significant deviation from a speed control set speed, the deviation indicating a loss of speed control;
        detecting low acceleration, the low acceleration indicating an inability to retain vehicle speed;
        detecting an extended throttle pedal, the extended throttle pedal indicating that said inability is due to said low vacuum condition;
        reducing a drive ratio of the transmission in response to a detected low vacuum condition to allow the engine to run at a higher speed for recharging the reservoir vacuum to eliminate the low vacuum condition; and
        recording an information fault code for service diagnostics, said fault code indicating that a loss of reservoir vacuum has occurred and no service action or repair is necessary;
    wherein the initialization detecting step includes the step of determining that a speed control set time is greater than a predetermined time.

2. The method according to claim 1 wherein the extended throttle pedal detecting step includes the step of determining that a throttle angle is greater than a predetermined angle.

3. The method according to claim 1 wherein the low acceleration detecting step includes the steps of:
    determining that a throttle angle is less than a previous throttle plus a predetermined angle, the previous throttle representing a throttle angle measurement taken a predetermined amount of time earlier; and determining that a vehicle output acceleration is less than a predetermined acceleration.

4. The method according to claim 3 wherein said predetermined acceleration is dependent upon a current transmission gear ratio.

5. The method according to claim 1 further comprising the step of determining that a transmission output speed is less than a predetermined speed.

6. The method according to claim 1 wherein said step of increasing a drive ratio of the transmission includes adjustment of a transmission control from a normal control operation, wherein said method further comprises the steps of:

detecting a need to terminate adjustment of the transmission control; and terminating adjustment of the transmission control.

7. The method according to claim 6 wherein the step of detecting a need to terminate adjustment of the transmission control includes the step of detecting an elimination of the low vacuum condition.

8. The method according to claim 7 wherein the elimination detecting step includes the steps of:

determining that a vehicle speed is greater than a predetermined speed; and determining that a throttle angle is less than a maximum angle minus a predetermined angle, the maximum angle taken over a period during the recharging step.

9. The method according to claim 6 wherein the step of detecting a need to terminate adjustment of the transmission control includes the step of determining that a throttle angle is less than a predetermined angle.

10. The method according to claim 6 wherein the step of detecting a need to terminate adjustment of the transmission control elimination detecting step includes the step of determining that a transmission output speed is greater than a predetermined speed.

11. The method according to claim 6 wherein the need detecting step includes the step of detecting a driver override condition.

12. The method according to claim 11 wherein the driver override detecting step includes determining that the transmission is not in speed control mode operation.

13. The method according to claim 11 wherein the driver override detecting step includes determining that a manual throttle override has taken place.

14. The method according to claim 13 wherein the step of detecting a need to terminate adjustment of the transmission control includes the step of enabling an upshift of the transmission.

15. The method according to claim 11 wherein the driver override detecting step includes determining that an overdrive lockout is engaged.

* * * * *